US010570585B2

(12) United States Patent
Yun et al.

(10) Patent No.: US 10,570,585 B2
(45) Date of Patent: Feb. 25, 2020

(54) CONTROL DEVICE AND CONTROL METHOD FOR CONSTRUCTION MACHINE

(71) Applicant: DOOSAN INFRACORE CO., LTD., Incheon (KR)

(72) Inventors: Hong Cheol Yun, Guri-si (KR); Byoung Heon Park, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 93 days.

(21) Appl. No.: 15/579,644

(22) PCT Filed: Jun. 8, 2016

(86) PCT No.: PCT/KR2016/006023
§ 371 (c)(1),
(2) Date: Dec. 5, 2017

(87) PCT Pub. No.: WO2016/200123
PCT Pub. Date: Dec. 15, 2016

(65) Prior Publication Data
US 2018/0171592 A1    Jun. 21, 2018

(30) Foreign Application Priority Data

Jun. 10, 2015 (KR) .................. 10-2015-0081660

(51) Int. Cl.
*E02F 9/22* (2006.01)
*E02F 9/20* (2006.01)
*F02D 35/02* (2006.01)

(52) U.S. Cl.
CPC ............ *E02F 9/2246* (2013.01); *E02F 9/20* (2013.01); *E02F 9/2004* (2013.01); *E02F 9/207* (2013.01);
(Continued)

(58) Field of Classification Search
CPC ......... E02F 9/2246; E02F 9/20; E02F 9/2004; E02F 9/2006; E02F 9/207; E02F 9/2217;
(Continued)

(56) References Cited

U.S. PATENT DOCUMENTS 6,820,356 B2    11/2004  Naruse et al.
2015/0315766 A1*  11/2015  Take .................. F02D 41/0205
                                                    701/22
(Continued)

FOREIGN PATENT DOCUMENTS

EP    1455439 A1    9/2004
EP    2284321 A2    2/2011
(Continued)

OTHER PUBLICATIONS

Extended European Search Report dated Jan. 9, 2019 in connection with European Patent Application No. 16807763.4.
(Continued)

*Primary Examiner* — Aaron L Troost
(74) *Attorney, Agent, or Firm* — Hauptman Ham, LLP

(57) ABSTRACT

The present invention relates to a control device and control method for a construction machine. A control device and control method for a construction machine according to the embodiments of the present invention can determine a need for the operation of the alternator by taking into account required electrical energy and the current charge amount of a battery when auxiliary power is received from the auxiliary power device, and can thus decrease an engine RPM in a situation in which power generation is not required, thereby improving the fuel efficiency of a construction machine.

16 Claims, 3 Drawing Sheets

(52) U.S. Cl.
CPC .......... *E02F 9/2066* (2013.01); *E02F 9/2217* (2013.01); *E02F 9/2228* (2013.01); *E02F 9/2285* (2013.01); *E02F 9/2292* (2013.01); *F02D 35/02* (2013.01)

(58) Field of Classification Search
CPC ..... E02F 9/2228; E02F 9/2285; E02F 9/2292; E02F 35/02
See application file for complete search history.

(56) References Cited

U.S. PATENT DOCUMENTS

2016/0273186 A1* 9/2016 Kami ...................... E02F 3/435
2017/0350327 A1* 12/2017 Edamura ............... E02F 9/2246

FOREIGN PATENT DOCUMENTS

| | | |
|---|---|---|
| JP | 2002-013425 A | 1/2002 |
| JP | 2015-86664 A | 5/2015 |
| KR | 10-2011-0057619 A | 6/2011 |
| KR | 10-1112136 B1 | 2/2012 |
| KR | 10-2015-0048415 A | 5/2015 |

OTHER PUBLICATIONS

International Search Report dated Sep. 1, 2016 corresponding to International Application No. PCT/KR2016/006023.

\* cited by examiner

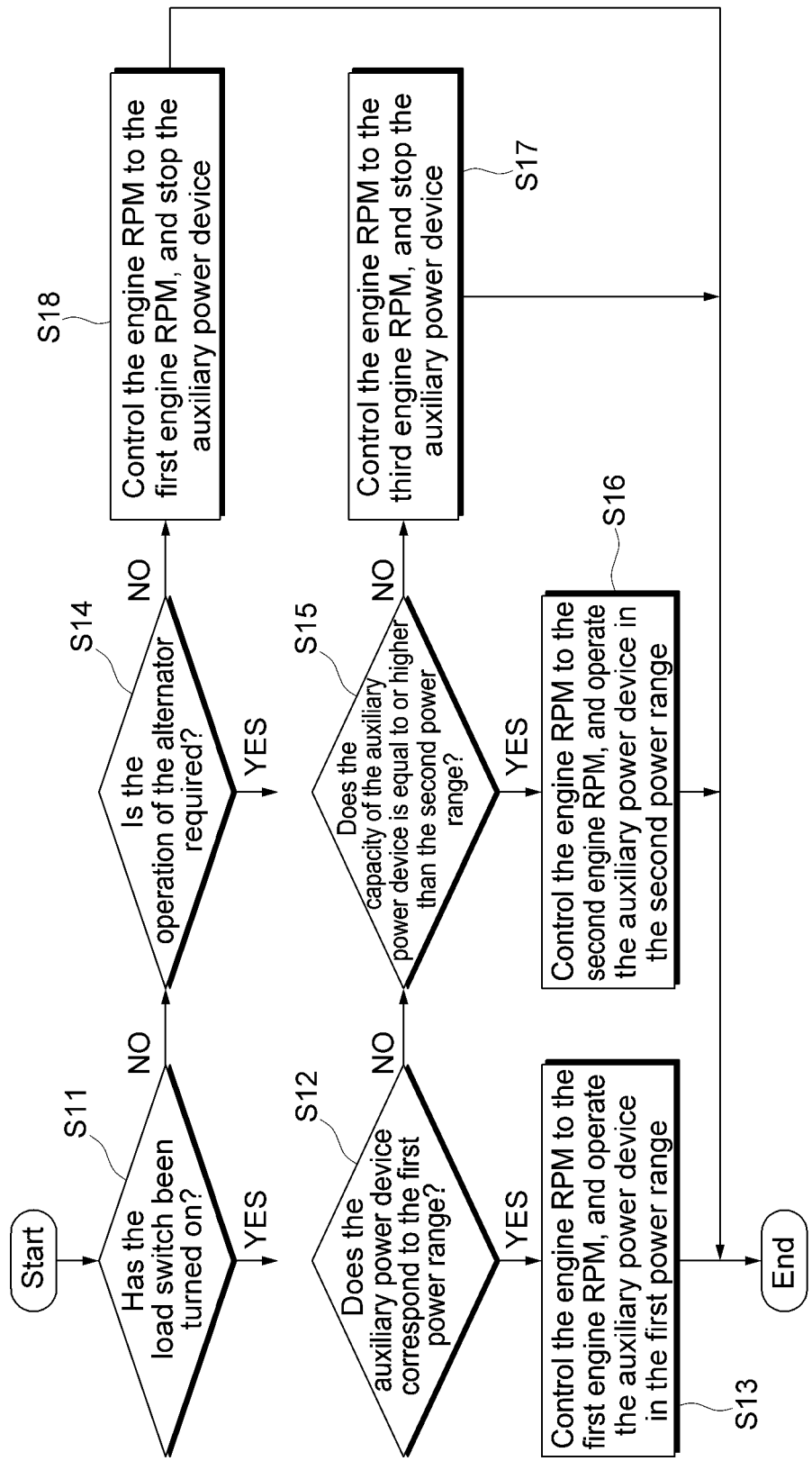

\# CONTROL DEVICE AND CONTROL METHOD FOR CONSTRUCTION MACHINE

CROSS REFERENCE TO RELATED APPLICATION

This application claims the priority of Korean Patent Application No. 10-2015-0081660 filed on Jun. 10, 2015, in the Korean Intellectual Property Office, the disclosure of which is incorporated herein by reference. Further, this application is the National Phase application of International Application No. PCT/ER2016/006023 filed Jun. 8, 2016, which designates the United States.

TECHNICAL FIELD

The present invention relates to a control device and control method for a construction machine, and more specifically to a control device and control method for a construction machine, which enable an engine to be controlled at an optimum engine revolutions-per-minute (RPM) when an auxiliary power device is added to a construction machine.

BACKGROUND ART

Generally, attempts to improve the fuel efficiency of construction machines have been made. In particular, as the importance of fuel efficiency increases, attempts to decrease an engine RPM when a construction machine is not used have been continuously made.

Meanwhile, an increase in the convenience of a user is required. For the convenience of a user, for example, an air conditioner is used, and other electric devices, etc. may be used. The other electric devices including the air conditioner consume electrical energy. Electrical energy is generated by operating an alternator by means of the power of an engine.

In other words, although an engine RPM needs to be decreased when fuel efficiency is taken into account, the engine RPM needs to be maintained at a predetermined level or higher in order to maintain the convenience of a user. Therefore, in order to optimally control the engine RPM, there is a demand for an advanced control technology for a construction machine.

DISCLOSURE

Technical Problem

An object of the present invention is to provide a control device and control method for a construction machine, which can decrease an engine RPM based on the consumption of electrical energy when auxiliary power is received from an auxiliary power device, thereby improving fuel efficiency.

Objects of the present invention are not limited to the above-described object, and other objects that have not been described will be readily apparent to a person having ordinary knowledge in the art to which the present invention pertains from the following description.

Technical Solution

In order to accomplish the above object, an embodiment of the present invention provides a control device for a construction machine, the control device including: an electronic joystick (10) configured to generate a request signal for operation of a working device; a main controller (20) configured to receive the request signal and generate a torque command and a pilot signal; an engine control unit (30) configured to receive the torque command and generate an engine revolutions-per-minute (RPM) command; an engine (40) configured to be operated in compliance with the engine RPM command; a hydraulic motor/pump (50) configured to be operated by the engine (40) and discharge a working fluid or to be driven by an entering working fluid and output power; a main control valve controller (60) configured to control an electronic proportional control valve (62) which receives the pilot signal and controls the working device; an intelligent battery sensor (73) configured to detect a charge amount of a battery; an auxiliary power device (80) additionally installed on the engine (40) or hydraulic motor/pump (50), and configured to provide auxiliary power to the engine (40) or hydraulic motor/pump (50); and an engine load device configured to operate as a load on the engine. Furthermore, the main controller (20) or engine control unit (30) adjusts the engine RPM based on whether the engine load device operates or not and whether the auxiliary power is provided from the auxiliary power device (80) or not.

Furthermore, the engine control unit may generate the engine RPM command based on one of a first engine RPM adapted for maintenance of the engine in an ON state, a second engine RPM adapted for power generation of an alternator, and a third engine RPM adapted for operation of a compressor of an air conditioner. The auxiliary power may be divided into a first power range, a second power range, and a third power range based on maximum capacity and minimum capacity which can be output from the auxiliary power device (80). When the engine load device has been turned on and the auxiliary power to be provided to the engine (40) or hydraulic motor/pump (50) corresponds to the first power range, the engine control unit may change the engine RPM to the first engine RPM, and the auxiliary power device (80) may be operated in the first power range.

In the control device according to an embodiment of the present invention, when the engine load device has been turned off and the auxiliary power to be provided to the engine (40) or hydraulic motor/pump (50) corresponds to the second power range, the engine control unit may change the engine RPM to the second engine RPM, and the auxiliary power device (80) may be operated in the second power range.

Furthermore, in the control device according to an embodiment of the present invention, the main controller (20) or engine control unit (30): when the engine load device has been turned off and the auxiliary power is provided from the auxiliary power device (80), may determine whether operation of the alternator is required; and when it is determined that the operation of the alternator is required, may determine whether the auxiliary power which is provided by the auxiliary power device (80) is equal to or higher than the second power range; and, when the auxiliary power which is provided by the auxiliary power device (80) is equal to or higher than the second power range, the engine control unit may change the engine RPM to the second engine RPM, and the auxiliary power device (80) may be operated in the second power range.

Furthermore, in the control device according to an embodiment of the present invention, the main controller (20) or engine control unit (30): when the engine load device has been turned off and the auxiliary power is provided from the auxiliary power device (80), may determine whether operation of the alternator is required; and when it is determined that the operation of the alternator is required, may determine whether the auxiliary power which is provided by the auxiliary power device (80) is equal to or higher than the second power range; and, when the auxiliary power which is provided by the auxiliary power device (80) is lower than the second power range, the engine control unit may change the engine RPM to the third engine RPM, and may stop operation of the auxiliary power device (80).

Furthermore, in the control device according to an embodiment of the present invention, the main controller (20) or engine control unit (30): when the engine load device has been turned off and the auxiliary power is provided from the auxiliary power device (80), may determine whether operation of the alternator is required; and, when it is determined that the operation of the alternator is not required, the engine control unit may change the engine RPM to the first engine RPM, and may stop operation of the auxiliary power device (80).

Furthermore, in the control device according to an embodiment of the present invention, the first engine RPM may be 600 rpm, the second engine RPM may be 800 rpm, the third engine RPM may be 1000 rpm, and each of differences between the first engine RPM, the second engine RPM, and the third engine RPM may be 10 rpm.

Furthermore, in the control device according to an embodiment of the present invention, the first power range may be a power range within which capacity that can be output from the auxiliary power device (80) enables the engine RPM to increase to 400 rpm or higher; the second power range may be a power range within which capacity that can be output from the auxiliary power device (80) enables the engine RPM to increase to a value within a range from 200 rpm to a value lower than 400 rpm; and the third power range may be a power range within which capacity that can be output from the auxiliary power device enables the engine RPM to increase to a value lower than 200 rpm.

In order to accomplish the above object, an embodiment of the present invention provides a control method for a construction machine, the control method controlling an engine and a hydraulic motor/pump configured to be operated by the engine, the control method including: determining whether an engine load device operating as a load on the engine operates; determining whether an auxiliary power device additionally installed on the engine or hydraulic motor/pump provides auxiliary power; and adjusting an engine RPM of the engine based on whether the engine load device operates and whether the auxiliary power device provides auxiliary power.

In this case, the engine RPM may be divided into and set to a first engine RPM adapted for maintenance of the engine in an ON state, a second engine RPM adapted for power generation of an alternator, and a third engine RPM adapted for operation of a compressor of an air conditioner; and the auxiliary power may be divided into a first power range, a second power range, and a third power range based on maximum capacity and minimum capacity which can be output from the auxiliary power device. Furthermore, when the engine load device has been turned on and the auxiliary power to be provided to the engine or hydraulic motor/pump corresponds to the first power range, the engine RPM may be changed to the first engine RPM, and the auxiliary power device may be operated in the first power range.

Furthermore, in accordance with the control method according to an embodiment of the present invention, when the auxiliary power to be provided to the engine (40) or hydraulic motor/pump (50) corresponds to the second power range, the engine RPM may be changed to the second engine RPM, and the auxiliary power device (80) may be operated in the second power range.

Furthermore, in accordance with the control method according to an embodiment of the present invention, when the engine load device has been turned off and the auxiliary power is provided from the auxiliary power device (80), it may be determined whether operation of the alternator is required; when it is determined that the operation of the alternator is required, it may be determined whether the auxiliary power which is provided by the auxiliary power device (80) is equal to or higher than the second power range; and when the auxiliary power which is provided by the auxiliary power device (80) is equal to or higher than the second power range, the engine RPM may be changed to the second engine RPM, and the auxiliary power device (80) may be operated in the second power range.

Furthermore, in accordance with the control method according to an embodiment of the present invention, when the engine load device has been turned off and the auxiliary power is provided from the auxiliary power device (80), it may be determined whether operation of the alternator is required; when it is determined that the operation of the alternator is required, it may be determined whether the auxiliary power which is provided by the auxiliary power device (80) is equal to or higher than the second power range; and when the auxiliary power which is provided by the auxiliary power device (80) is lower than the second power range, the engine RPM may be changed to the third engine RPM, and operation of the auxiliary power device (80) may be stopped.

Furthermore, in accordance with the control method according to an embodiment of the present invention, when the engine load device has been turned off and the auxiliary power is provided from the auxiliary power device (80), it may be determined whether operation of the alternator is required; and when it is determined that the operation of the alternator is not required, the engine RPM may be changed to the first engine RPM, and operation of the auxiliary power device (80) may be stopped.

Furthermore, in accordance with the control method according to an embodiment of the present invention, the first engine RPM may be 600 rpm, the second engine RPM may be 800 rpm, the third engine RPM may be 1000 rpm, and each of differences between the first engine RPM, the second engine RPM, and the third engine RPM may be 10 rpm.

Furthermore, in accordance with the control method according to an embodiment of the present invention, the first power range may be a power range within which capacity that can be output from the auxiliary power device (80) enables the engine RPM to increase to 400 rpm or higher; the second power range may be a power range within which capacity that can be output from the auxiliary power device (80) enables the engine RPM to increase to a value within a range from 200 rpm to a value lower than 400 rpm; and the third power range may be a power range within which capacity that can be output from the auxiliary power device enables the engine RPM to increase to a value lower than 200 rpm.

Advantageous Effects

The control device and control method for a construction machine according to the embodiments of the present invention, which are configured as described above, can determine a need for the operation of the alternator by taking into account required electrical energy and the current charge amount of a battery when auxiliary power is received from the auxiliary power device, and can thus decrease an engine RPM in a situation in which power generation is not required, thereby improving the fuel efficiency of a construction machine.

DESCRIPTION OF DRAWINGS

FIG. 3 is a flowchart illustrating a control device and control method for a construction machine according to embodiments of the present invention.

MODE FOR INVENTION

The advantages and features of the present invention and methods for implementing the advantages and the features will be apparent from embodiments that will be described in detail below with reference to the accompanying drawings.

The embodiments of the present invention will be described in detail below with reference to the accompanying drawings. The embodiments are provided as examples merely to help to understand the present invention. It should be understood that the present invention may be practiced in variously modified forms different from the embodiment described therein. Furthermore, in the following description of the present invention, when it is determined that a detailed description of a related well-known function or component may unnecessarily make the gist of the present invention obscure, it will be omitted.

Meanwhile, technical terms to be described later are terms defined in light of their functions in the present invention and may vary according to the intention or practice of a manufacturer. Accordingly, the terms should be defined based on the content of the overall specification.

Throughout the specification, the same reference symbols denote the same components.

Figure 1:
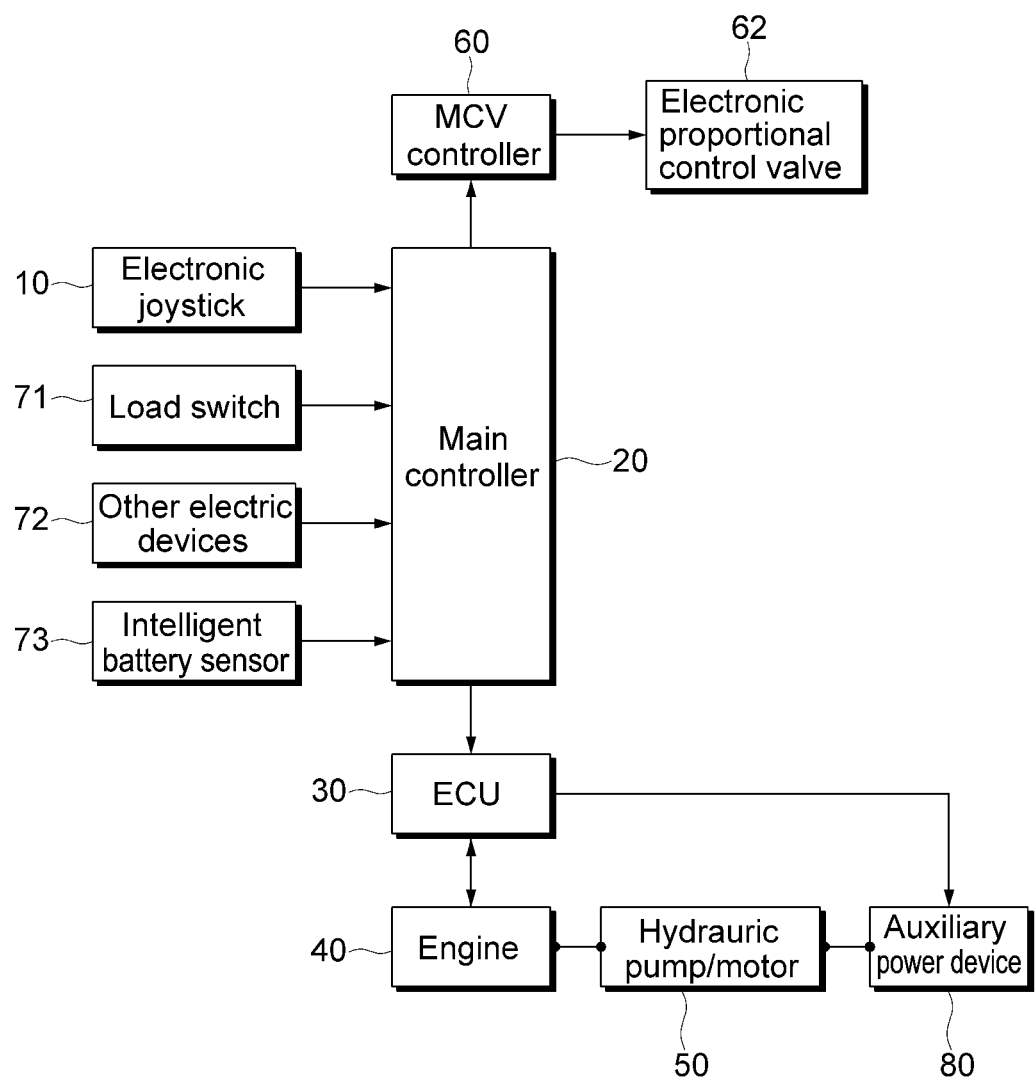
FIG. 1 is a view showing a control device and control method for a construction machine according to embodiments of the present invention.
Figure 2:
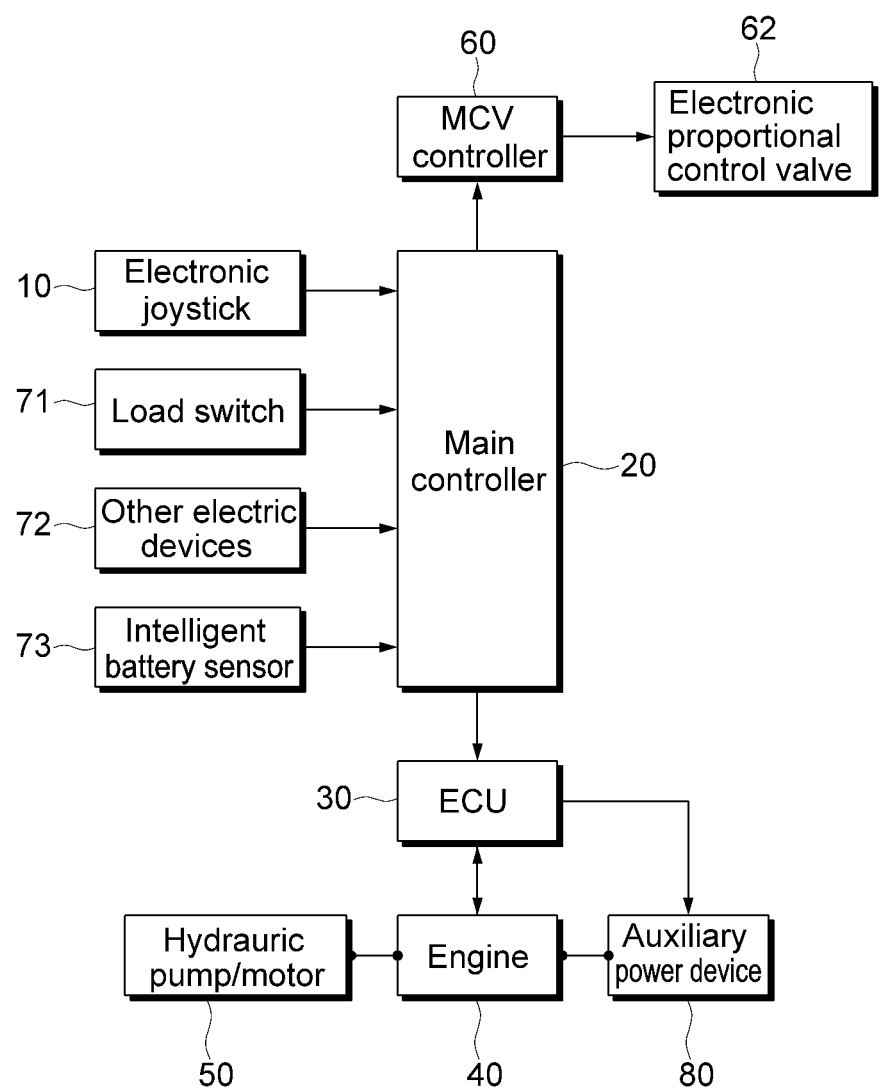
FIG. 2 is a view showing a control device and control method for a construction machine according to other embodiments of the present invention.

A control device and control method for a construction machine according to embodiments of the present invention will be described below with reference to FIGS. 1 to 3. FIG. 1 is a view showing a control device and control method for a construction machine according to embodiments of the present invention. FIG. 2 is a view showing a control device and control method for a construction machine according to other embodiments of the present invention. FIG. 3 is a flowchart illustrating a control device and control method for a construction machine according to embodiments of the present invention.

Embodiment 1

A control device for a construction machine according to an embodiment of the present invention may include an electronic joystick 10, a main controller 20, an engine control unit 30, an engine 40, a hydraulic motor/pump 50, a main control valve controller 60, an engine load device, and an auxiliary power device 80.

The engine load device refers to a device which operates as a load on an engine 40. As an example, the engine load device may include an air conditioner, a cooling fan, etc.

A load switch 71 configured to operate the engine load device is provided in the operator cab of a construction machine. When the load switch 71 is turned on or off, an on/off signal of the load switch 71 may be provided to the main controller 20.

Furthermore, other electric devices 72 may be provided in the operator cab. For example, the other electric devices may include a DMB, an auxiliary terminal, etc. When each of the other electric devices 72 is turned on or off, an on/off signal of the other electric device 72 may be provided to the main controller 20.

Furthermore, the construction machine may include an intelligent battery sensor 73. The intelligent battery sensor 73 detects the charge amount of a battery, and provides notification of the amount of stored electrical energy. The charge amount of the battery detected by the intelligent battery sensor 73 may be provided to the main controller 20.

The electronic joystick 10 generates a request signal. In greater detail, an operator manipulates the electronic joystick 10 in order to operate a specific working device according to the intention of the operator. In this case, the electronic joystick 10 generates a request signal adapted to control the corresponding working device.

For example, when a corresponding construction machine is an excavator, the working device may include a boom cylinder configured to operate a boom, an arm cylinder configured to operate an arm, a bucket cylinder configured to operate a bucket, and an option device in the case where the option device is connected.

On the other hand, the above-described request signal may be a signal adapted to rotate an upper rotating structure, or may be a signal adapted to enable the construction machine to travel.

The main controller 20 receives the request signal, and generates a torque command and a pilot signal. The torque command may be a signal adapted to control the output of the engine 40 or the output of the hydraulic motor/pump. The pilot signal may be a signal adapted to control any one of the above-described various working devices.

Meanwhile, the above-described main controller 20 may be a vehicle control unit (VCU).

The engine control unit 30 receives the torque command, and generates an engine RPM command. In other words, the engine control unit 30 is a device configured to control the engine 40.

The engine 40 implements a corresponding engine RPM in compliance with the engine RPM command. In other words, the engine 40 outputs power in order to implement the requested torque command. Generally, of construction machinery, an excavator is controlled within an engine RPM range from 800 rpm to 2000 rpm.

The hydraulic motor/pump 50 may be operated by the engine 40, and may discharge a working fluid. Furthermore, the hydraulic motor/pump 50 may be driven by an entering working fluid, and may output power. In other words, the hydraulic motor/pump 50 may be used as a hydraulic pump when discharging a working fluid, whereas the hydraulic motor/pump 50 may be used as a hydraulic motor when being driven by the pressure of a working fluid.

Meanwhile, when the hydraulic motor/pump 50 is used as a hydraulic motor, it may generate electricity by operating an electric generator, i.e., an alternator, and the generated electrical energy may be stored in an energy storage device.

The main control valve controller 60 receives the pilot signal, and controls an electronic proportional control valve 62 configured to control a corresponding working device.

In greater detail, each working device may include the electronic proportional control valve 62 in order to change the flow rate and flow direction of the working fluid. For example, when the above-described pilot signal is a pilot signal adapted to lift a boom, the electronic proportional control valve 62 configured to supply a working fluid to a boom actuator is operated, and thus the working fluid is provided to the boom actuator in a direction which lifts the boom.

In other words, the main control valve controller 60 may be provided with an electronic proportional control valve 62 configured to control each working device.

The auxiliary power device 80 is additionally installed on the engine 40 or hydraulic motor/pump 50, and provides auxiliary power to the engine 40 or hydraulic motor/pump 50.

In greater detail, as shown in FIG. 1, the auxiliary power device 80 may be added to the hydraulic motor/pump 50. In this case, the auxiliary power device 80 may be a hydraulic motor/pump. Furthermore, the auxiliary power device 80, i.e., a hydraulic motor/pump, may be driven by the pressure of a working fluid stored in an accumulator. Accordingly, the auxiliary power device 80 assists the hydraulic motor/pump 50 in operating, thus resulting in a reduction in a load applied to the engine 40.

Furthermore, as shown in FIG. 2, the auxiliary power device 80 may be additionally installed on the engine 40. In this case, the auxiliary power device 80 may be an electric motor. The electric motor may receive electrical energy from the energy storage device, and may be then driven.

The energy storage device may be a device configured to store electrical energy generated using a working fluid discharged from a boom cylinder when a boom is lowered by its own weight, or to store electrical energy generated using a working fluid discharged when the upper rotating structure is rotated by inertia. In this case, the generation may be performed using a hydraulic motor and an electric generator.

Meanwhile, as the number of electric devices using electrical energy increases in the construction machine, the capacity of the alternator needs to increase for the purposes of the charging of the battery and the control of the load of the electric devices.

In particular, although a low speed limit satisfying the required torque of the engine RPM can be further decreased, there is a case where it is necessary to maintain or increase the engine RPM at or to a predetermined level or higher in order to control the amount of power to be generated by the alternator, as described above.

Furthermore, in order to meet a required performance level for an air conditioner, an engine RPM needs to be maintained at a predetermined level or higher in order to ensure the performance of the compressor of the air conditioner when the air conditioner is operated.

On the other hand, when the engine 40 receives auxiliary power from the auxiliary power device 80, a load may be reduced, and thus the engine RPM may be increased. In other words, a margin for a reduction in the engine RPM is generated.

Furthermore, when the hydraulic motor/pump 50 receives auxiliary power from the auxiliary power device 80, a load may be decreased, and thus the torque of the hydraulic motor/pump may be increased. In other words, a margin for an increase in the torque of the hydraulic motor/pump is generated.

Accordingly, in the control device for a construction machine according to the embodiment of the present invention, the main controller 20 or engine control unit 30 may adjust the engine RPM based on whether the load switch 71 is turned on or off and whether auxiliary power is provided from the auxiliary power device 80 or not.

In other words, when auxiliary power is received from the auxiliary power device, the amount of power to be generated may be determined by taking into account required electrical energy and the current charge amount of the battery. Accordingly, the fuel efficiency of the construction machine can be improved by decreasing the engine RPM in a situation where power generation is not required.

Meanwhile, the above-described required electrical energy may be determined based on information about ON/OFF of the electric devices input to the main controller 20. Furthermore, the level of the currently available electrical energy may be determined via the intelligent battery sensor 73.

Embodiment 2

In a control device for a construction machine according to an embodiment of the present invention, the engine RPM may be subdivided into a first engine RPM adapted for the maintenance of the engine in an ON state, a second engine RPM adapted for the power generation of the alternator, and a third engine RPM adapted for the operation of the compressor of the air conditioner.

Furthermore, in the control device for a construction machine according to the embodiment of the present invention, the auxiliary power may be divided into a first power range, a second power range, and a third power range based on maximum capacity and minimum capacity which can be output from the auxiliary power device 80. More specifically, the auxiliary power device 80 is driven by the pressure of the working fluid stored in the accumulator, and thus the auxiliary power which is provided by the auxiliary power device 80 according to the pressure of the working fluid stored in the accumulator may be distinctively divided into the first power range, the second power range, and the third power range in decreasing order.

Furthermore, when the engine load device is turned on and the capacity of the auxiliary power to be provided to the engine 40 or hydraulic motor/pump 50 corresponds to the first power range, control is performed such that the engine RPM is changed to the first engine RPM, and the auxiliary power device 80 is operated in the first power range.

In other words, when auxiliary power can be sufficiently provided, the control device for a construction machine according to the embodiment of the present invention may decrease the engine RPM to the extent that the engine is not turned off, thereby improving the fuel efficiency of the construction machine.

Embodiment 3

When the engine load device is turned on and the capacity of auxiliary power to be provided to the engine 40 or hydraulic motor/pump 50 corresponds to the second power range, the control device for a construction machine according to the embodiment of the present invention performs control so that the engine RPM is changed to the second engine RPM, and drives the auxiliary power device 80 in the second power range.

In other words, when the capacity of the auxiliary power is decreased to the second power range by using the auxiliary power device 80, control is performed such that the engine RPM is changed to the second engine RPM, thereby enabling the alternator to generate power.

Accordingly, the control device for a construction machine according to the embodiment of the present invention generates electrical energy by performing power generation via the alternator. The generated electrical energy enables the performance of the electric devices to be desirably maintained. Moreover, the engine RPM is not excessively increased, and thus the fuel efficiency of the construction machine can be improved.

Embodiment 4

A control device for a construction machine according to an embodiment of the present invention can improve fuel efficiency even in a state in which the air conditioner is not operated.

In other words, when the load switch 71 is turned off and auxiliary power is provided from the auxiliary power device 80, the main controller 20 or engine control unit 30 determines whether the operation of the alternator is required.

Furthermore, when it is determined that the operation of the alternator is required, it is determined whether the capacity of the auxiliary power device 80 is equal to or higher than the second power range.

Moreover, when the capacity of the auxiliary power device 80 is equal to or higher than the second power range, control is performed such that the engine RPM is changed to the second engine RPM and the auxiliary power device 80 is operated in the second power range.

Accordingly, the control device for a construction machine according to the embodiment of the present invention generates electrical energy by performing power generation via the alternator. The generated electrical energy enables the performance of the electric devices to be desirably maintained. Moreover, the engine RPM is not excessively increased, and thus the fuel efficiency of the construction machine can be improved.

Embodiment 5

A control device for a construction machine according to an embodiment of the present invention can deal with a case where the capacity of auxiliary power provided by the auxiliary power device 80 is decreased.

In greater detail, when the load switch 71 is turned off and auxiliary power is provided from the auxiliary power device 80, the main controller 20 or engine control unit 30 determines whether the operation of the alternator is required.

Furthermore, when it is determined that the operation of the alternator is required, it is determined whether the capacity of the auxiliary power device 80 is equal to or higher than the second power range.

Moreover, when the capacity of the auxiliary power device 80 is lower than the second power range, control is performed such that the engine RPM is changed to the third engine RPM, and control is performed such that the auxiliary power device 80 is not operated.

In other words, when the capacity of auxiliary power is decreased, there is a case where the auxiliary power does not help to increase the engine RPM. In this case, the amount of power to be generated via the alternator is increased by increasing the engine RPM. Accordingly, electrical energy is generated by performing power generation via the alternator. The generated electrical energy enables the performance of the electric devices to be desirably maintained.

Embodiment 6

A control device for a construction machine according to an embodiment of the present invention can deal with a case where the air conditioner is not used and the amount of electricity used is small.

In greater detail, when the load switch 71 is turned off and auxiliary power is provided from the auxiliary power device 80, the main controller 20 or engine control unit 30 determines whether the operation of the alternator is required.

Furthermore, when it is determined that the operation of the alternator is not required, control is formed such that the engine RPM is changed to the first engine RPM and control is performed such that the auxiliary power device 80 is not operated.

In other words, when the consumption of electrical energy is low, the engine RPM is changed to the first engine RPM, thereby improving the fuel efficiency of the construction machine.

Embodiment 7

Meanwhile, a control device for a construction machine according to an embodiment of the present invention may subdivide the engine RPM, as follows.

In other words, the first engine RPM may be 600 rpm, the second engine RPM may be 800 rpm, and the third engine RPM may be 1000 rpm. Furthermore, each of the differences between the first, second, and third engine RPMs may be 10 rpm.

A situation may vary with the specifications of an engine. When the first engine RPM is set to 600 rpm or higher, the engine may not be turned off or abnormality may not occur by taking into account only the torque of the hydraulic motor/pump 50.

Furthermore, the alternator is operated in order to adjust the charge amount according to the state of the electric device or battery. When the second engine RPM is set to 800 rpm or higher, the power generation of the alternator may be performed.

Furthermore, there is a case where the compressor of the air conditioner is operated in order to optimize the performance of the air conditioner. When the third engine RPM is set to 1000 rpm or higher, the compressor of the air conditioner may be operated.

Furthermore, each of the differences between the first engine RPM, the second engine RPM, and the third engine RPM may be 10 rpm. The reason why the difference is provided is that the engine RPM varies continuously for the engine to receive an engine RPM command and converge into the engine RPM command. For this reason, the first engine RPM, the second engine RPM, and the third engine RPM cannot be accurately maintained at specific values, and vary within predetermined ranges. Accordingly, the above-described difference is intended to embrace the ranges of variation.

Meanwhile, the numerical values of the first engine RPM, the second engine RPM, and the third engine RPM are presented to help to understand the present invention, and the range of the rights of the present invention is not limited thereto.

Embodiment 8

In a control device for a construction machine according to an embodiment of the present invention, the first power range may be a power range within which the capacity that can be output from the auxiliary power device 80 enables the engine RPM to increase to 400 rpm or higher.

Furthermore, in the control device for a construction machine according to the embodiment of the present invention, the second power range may be a power range within which the capacity that can be output from the auxiliary power device 80 enables the engine RPM to increase to a value within a range from 200 rpm to a value lower than 400 rpm.

The third power range may be a power range within which the capacity that can be output from the auxiliary power device 80 enables the engine RPM to increase to a value lower than 200 rpm. In other words, in the case of the third power range, an increase in the engine RPM is insignificant. Accordingly, when the auxiliary power device 80 operates in the third power range, the driving of the auxiliary power device 80 may be stopped.

In other words, the capacity of auxiliary power which can be provided by the auxiliary power device 80 is sufficient, this may be classified as a general case, and then control may be performed.

Accordingly, the control device for a construction machine according to the embodiment of the present invention can deal with the action of the alternator by increasing the engine RPM when the capacity of auxiliary power is not sufficient.

Embodiment 9

A control method for a construction machine according to an embodiment of the present invention will be described below.

In accordance with the control method for a construction machine according to the embodiment of the present invention, first, the engine RPM is subdivided into a first engine RPM adapted for the maintenance of the engine in an ON state, a second engine RPM adapted for the power generation of the alternator, and a third engine RPM adapted for the operation of the compressor of the air conditioner, and information about the first engine RPM, the second engine RPM, and the third engine RPM is stalled on the main controller 20 or engine control unit 30.

Furthermore, the auxiliary power is subdivided into a first power range, a second power range, and a third power range in a range from maximum capacity to minimum capacity which can be output from the auxiliary power device 80, and information about the first power range, the second power range, and the third power range is installed on the main controller 20 or engine control unit 30.

Furthermore, the engine 40 or hydraulic motor/pump 50 receives auxiliary power from the auxiliary power device 80. Thereafter, control may be performed according to the control method for a construction machine according to the embodiment of the present invention.

First, it is determined whether the load switch 71 has been turned on at step S11.

When the load switch 71 is in a turned-on state, it is determined whether the auxiliary power corresponds to the first power range at step S12.

When the auxiliary power corresponds to the first power range, control is performed such that the engine RPM is changed to the first engine RPM and control is performed such that the auxiliary power device 80 is operated in the first power range at step S13.

In other words, when a large amount of electrical energy is used but the capacity of the auxiliary power is sufficient, the fuel efficiency of a construction machine can be improved by decreasing the engine RPM.

Embodiment 10

A control method for a construction machine according to an embodiment of the present invention may deal with a case where the capacity of auxiliary power is general.

In greater detail, when the capacity of auxiliary power which is provided to the engine 40 or hydraulic motor/pump 50 corresponds to the second power range, control is performed such that the engine RPM is changed to the second engine RPM, and control is performed such that the auxiliary power device 80 is operated in the second power range.

Accordingly, the control method for a construction machine according to the embodiment of the present invention generates electrical energy by performing power generation via the alternator. The generated electrical energy enables the performance of the electric devices to be desirably maintained. Moreover, the engine RPM is not excessively increased, and thus the fuel efficiency of the construction machine can be improved.

Embodiment 11

A control method for a construction machine according to an embodiment of the present invention may deal with a case where the consumption of electrical energy is low but the capacity of auxiliary power is general.

In greater detail, when the load switch 71 has been turned off at step S11 and auxiliary power is provided from the auxiliary power device 80, the main controller 20 or engine control unit 30 determines whether the operation of the alternator is required at step S14.

When it is determined that the operation of the alternator is required, it is determined whether the capacity of the auxiliary power device 80 is equal to or higher than the second power range at step S15.

When the capacity of the auxiliary power device 80 is equal to or higher than the second power range, control is performed such that the engine RPM is changed to the second engine RPM, and control is performed such that the auxiliary power device 80 is operated in the second power range.

Accordingly, the control method for a construction machine according to the embodiment of the present invention generates electrical energy by performing power generation via the alternator. The generated electrical energy enables the performance of the electric devices to be desirably maintained. Moreover, the engine RPM is not excessively increased, and thus the fuel efficiency of the construction machine can be improved.

Embodiment 12

A control method for a construction machine according to an embodiment of the present invention can deal with a case where electrical energy is consumed but the capacity of auxiliary power is insufficient.

In greater detail, when the load switch 71 has been turned off at step S11 and auxiliary power is provided from the auxiliary power device 80, the main controller 20 or engine control unit 30 determines whether the operation of the alternator is required at step S14.

Furthermore, when it is determined that the operation of the alternator is required, it is determines whether the capacity of the auxiliary power device 80 is equal to or higher than the second power range at step S15.

When the capacity of the auxiliary power device 80 is lower than the second power range, control is performed such that the engine RPM is changed to the third engine RPM and control is performed such that the auxiliary power device 80 is operated at step S17.

Accordingly, in the control method for a construction machine according to the embodiment of the present invention, when the capacity of auxiliary power is decreased, there is a case where the auxiliary power does not help to increase the engine RPM. In this case, the amount of power to be generated via the alternator is increased by increasing the engine RPM. Accordingly, electrical energy is generated by performing power generation via the alternator. The generated electrical energy enables the performance of the electric devices to be desirably maintained.

Embodiment 13

A control method for a construction machine according to an embodiment of the present invention can deal with a case where the consumption of electrical energy is high.

In greater detail, when the load switch 71 has been turned off at step S11 and auxiliary power is provided from the auxiliary power device 80, the main controller 20 or engine control unit 30 determines whether the operation of the alternator is required at step S14.

Furthermore, when it is determined that the operation of the alternator is not required, control is performed such that the engine RPM is changed to the first engine RPM and control is performed such that the auxiliary power device 80 is not operated at step S18.

In other words, when the consumption of electrical energy is low, the fuel efficiency of a construction machine can be improved by changing the engine RPM to the first engine RPM.

As described above, the control device and control method for a construction machine according to the embodiments of the present invention can improve the fuel efficiency of a construction machine by decreasing the engine RPM while taking into account the consumption of electrical energy and the capacity of auxiliary power.

Furthermore, the control device and control method for a construction machine according to the embodiments of the present invention enable power generation to be stably performed by performing control so that the engine RPM is increased when the capacity of auxiliary power is insufficient notwithstanding the consumption of electrical energy is required, thereby enabling electric devices to be desirably used.

While the embodiments of the present invention have been described with reference to the accompanying drawings, it will be understood that a person skilled in the art to which the present invention pertains may practice the present invention in other specific forms without changing the technical spirit or essential features of the present invention.

Therefore, it should be understood that the above-described embodiments are illustrative but not restrictive in all aspects. The scope of the present invention is defined based on the attached claims. All modifications or alterations derived from the meanings and scope of the claims and concepts equivalent to the claims should be construed as being included in the scope of the present invention.

INDUSTRIAL APPLICABILITY

The control device and control method for a construction machine according to the embodiments of the present invention can be used to optimally implement an engine RPM when an auxiliary power device is added to an engine or hydraulic motor/pump and auxiliary power is received from the auxiliary power device.

The invention claimed is:

1. A control device for a construction machine, the control device comprising:
    an electronic joystick configured to generate a request signal for operation of a working device;
    a main controller configured to receive the request signal and generate a torque command and a pilot signal;
    an engine control unit configured to receive the torque command and generate an engine revolutions-per-minute (RPM) command;
    an engine configured to be operated in compliance with the engine RPM command;
    a hydraulic motor/pump configured to be operated by the engine and discharge a working fluid or to be driven by an entering working fluid and output power;
    an auxiliary power device additionally installed on the engine or hydraulic motor/pump, and configured to provide auxiliary power to the engine or hydraulic motor/pump; and
    an engine load device including an air conditioner compressor configured to be powered by the engine;
    wherein when the auxiliary rower is provided from the auxiliary power device, the main controller or engine control unit controls the engine RPM of the engine to be lowered to a first engine RPM adapted for the maintenance of the engine in an ON state.

2. The control device of claim 1, wherein
    the engine control unit is configured to generate the engine RPM command based on one of the first engine RPM, a second engine RPM adapted for power generation of an alternator, and a third engine RPM adapted for operation of the engine load device,
    the auxiliary power is divided into a first power range, a second power range, and a third power range based on maximum capacity and minimum capacity which can be output from the auxiliary power device, and
    when the engine load device has been turned on and the auxiliary power corresponds to the first power range, the main controller or engine control unit changes the engine RPM to the first engine RPM, and the auxiliary power device is operated in the first power range.

3. The control device of claim 2, wherein when the engine load device has been turned on and the auxiliary power corresponds to the second power range, the main controller or engine control unit changes the engine RPM to the second engine RPM, and the auxiliary power device is operated in the second power range.

4. The control device of claim 2, wherein
    the first engine RPM is 600 rpm, the second engine RPM is 800 rpm, the third engine RPM is 1000 rpm, and
    each of differences between the first engine RPM, the second engine RPM, and the third engine RPM is 10 rpm.

5. The control device of claim 2, wherein
    the first power range is a power range within which first capacity that can be output from the auxiliary power device enables the engine RPM to increase to 400 rpm or higher,
    the second power range is a power range within which second capacity that can be output from the auxiliary power device enables the engine RPM to increase to a value within a range from 200 rpm to a value lower than 400 rpm, and the third power range is a power range within which third capacity that can be output from the auxiliary power device enables the engine RPM to increase to a value lower than 200 rpm.

6. The control device of claim 1, wherein
the engine control unit is configured to generate the engine RPM command based on one of the first engine RPM, a second engine RPM adapted for power generation of an alternator, and a third engine RPM adapted for operation of the engine load device,
the auxiliary power is divided into a first power range, a second power range, and a third power range based on maximum capacity and minimum capacity which can be output from the auxiliary power device,
the main controller or engine control unit:
when the engine load device has been turned off and the auxiliary power is provided from the auxiliary power device, determines whether operation of the alternator is required; and
when it is determined that the operation of the alternator is required, determines whether the auxiliary power which is provided by the auxiliary power device is equal to or higher than the second power range, and
when the auxiliary power which is provided by the auxiliary power device is equal to or higher than the second power range, the engine control unit changes the engine RPM to the second engine RPM, and the auxiliary power device is operated in the second power range.

7. The control device of claim 1, wherein
the engine control unit is configured to generate the engine RPM command based on one of the first engine RPM, a second engine RPM adapted for power generation of an alternator, and a third engine RPM adapted for operation of the engine load device,
the auxiliary power is divided into a first power range, a second power range, and a third power range based on maximum capacity and minimum capacity which can be output from the auxiliary power device,
the main controller or engine control unit:
when the engine load device has been turned off and the auxiliary power is provided from the auxiliary power device, determines whether operation of the alternator is required; and
when it is determined that the operation of the alternator is required, determines whether the auxiliary power which is provided by the auxiliary power device is equal to or higher than the second power range, and
when the auxiliary power which is provided by the auxiliary power device is lower than the second power range, the engine control unit changes the engine RPM to the third engine RPM, and stops operation of the auxiliary power device.

8. The control device of claim 1, wherein
when the engine load device has been turned off and the auxiliary power is provided from the auxiliary power device, the main controller or engine control unit determines whether operation of an alternator is required, and
when it is determined that the operation of the alternator is not required, the engine control unit changes the engine RPM to the first engine RPM, and stops operation of the auxiliary power device.

9. A control method for a construction machine, the control method controlling an engine and a hydraulic motor/pump configured to be operated by the engine, the control method comprising:
determining whether an engine load device including an air conditioner compressor power as a load on the engine;
determining whether an auxiliary power device additionally installed on the engine or hydraulic motor/pump provides auxiliary power; and
adjusting an engine RPM of the engine based on whether the engine load device operates and whether the auxiliary power device provides auxiliary power,
wherein when the auxiliary power is provided from the auxiliary power device, the engine RPM of the engine is adjusted to be lowered to a first engine RPM that maintains the engine in an ON state.

10. The control method of claim 9, wherein:
the engine RPM is divided into and set to the first engine RPM, a second engine RPM adapted for power generation of an alternator, and a third engine RPM adapted for operation of the engine load device,
the auxiliary power is divided into a first power range, a second power range, and a third power range based on maximum capacity and minimum capacity which can be output from the auxiliary power device, and
when the engine load device has been turned on and the auxiliary power corresponds to the first power range, the engine RPM is changed to the first engine RPM, and the auxiliary power device is operated in the first power range.

11. The control method of claim 10, wherein when the auxiliary power corresponds to the second power range, the engine RPM is changed to the second engine RPM, and the auxiliary power device is operated in the second power range.

12. The control method of claim 10, wherein
when the engine load device has been turned off, it is determined whether operation of the alternator is required, and
when it is determined that the operation of the alternator is not required, the engine RPM is changed to the first engine RPM, and operation of the auxiliary power device is stopped.

13. The control method of claim 10, wherein
the first engine RPM is 600 rpm, the second engine RPM is 800 rpm, the third engine RPM is 1000 rpm, and
each of differences between the first engine RPM, the second engine RPM, and the third engine RPM is 10 rpm.

14. The control method of claim 10, wherein
the first power range is a power range within which first capacity that can be output from the auxiliary power device enables the engine RPM to increase to 400 rpm or higher,
the second power range is a power range within which second capacity that can be output from the auxiliary power device enables the engine RPM to increase to a value within a range from 200 rpm to a value lower than 400 rpm, and
the third power range is a power range within which third capacity that can be output from the auxiliary power device enables the engine RPM to increase to a value lower than 200 rpm.

15. A control device for a construction machine, the control device comprising:

an electronic joystick configured to generate a request signal for operation of a working device;
a main controller configured to receive the request signal and generate a torque command and a pilot signal;
an engine control unit configured to receive the torque command and generate an engine revolutions-per-minute (RPM) command;
an engine configured to be operated in compliance with the engine RPM command;
a hydraulic motor/pump configured to be operated by the engine and discharge a working fluid or to be driven by an entering working fluid and output power;
a main control valve controller configured to control an electronic proportional control valve which receives the pilot signal and controls the working device;
an intelligent battery sensor configured to detect a charge amount of a battery;
an auxiliary power device additionally installed on the engine or hydraulic motor/pump, and configured to provide auxiliary power to the engine or hydraulic motor/pump; and
an engine load device configured to operate as a load on the engine;
wherein
the main controller or engine control unit adjusts the engine RPM based on whether the engine load device operates or not and whether the auxiliary power is provided from the auxiliary power device or not,
the engine control unit generates the engine RPM command based on one of a first engine RPM adapted for maintenance of the engine in an ON state, a second engine RPM adapted for power generation of an alternator, and a third engine RPM adapted for operation of a compressor of an air conditioner,
the auxiliary power is divided into a first power range, a second power range, and a third power range based on maximum capacity and minimum capacity which can be output from the auxiliary power device, and
when the engine load device has been turned on and the auxiliary power to be provided to the engine or hydraulic motor/pump corresponds to the first power range, the engine control unit changes the engine RPM to the first engine RPM, and the auxiliary power device is operated in the first power range.

16. A control method for a construction machine, the control method controlling an engine and a hydraulic motor/pump configured to be operated by the engine, the control method comprising:
determining whether an engine load device operating as a load on the engine operates;
determining whether an auxiliary power device additionally installed on the engine or hydraulic motor/pump provides auxiliary power; and
adjusting an engine RPM of the engine based on whether the engine load device operates and whether the auxiliary power device provides auxiliary power,
wherein
the engine RPM is divided into and set to a first engine RPM adapted for maintenance of the engine in an ON state, a second engine RPM adapted for power generation of an alternator, and a third engine RPM adapted for operation of a compressor of an air conditioner,
the auxiliary power is divided into a first power range, a second power range, and a third power range based on maximum capacity and minimum capacity which can be output from the auxiliary power device, and
when the engine load device has been turned on and the auxiliary power to be provided to the engine or hydraulic motor/pump corresponds to the first power range, the engine RPM is changed to the first engine RPM, and the auxiliary power device is operated in the first power range.

* * * * *